(12) United States Patent
Theriault

(10) Patent No.: US 7,022,629 B2
(45) Date of Patent: Apr. 4, 2006

(54) PRINT THROUGH ELIMINATION IN FIBER REINFORCED MATRIX COMPOSITE MIRRORS AND METHOD OF CONSTRUCTION

(75) Inventor: P. Chris Theriault, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 134 days.

(21) Appl. No.: 10/639,059

(22) Filed: Aug. 12, 2003

(65) Prior Publication Data
US 2005/0037679 A1    Feb. 17, 2005

(51) Int. Cl.
G02B 5/08  (2006.01)
G02B 7/182 (2006.01)
D04H 3/00  (2006.01)

(52) U.S. Cl. .................. 442/349; 442/60; 442/239; 442/308; 442/334; 442/340; 977/DIG. 1; 359/838; 359/871; 359/883

(58) Field of Classification Search ........... 359/883, 359/871, 838; 442/60, 238, 308, 334, 340; 977/DIG. 1
See application file for complete search history.

(56) References Cited

U.S. PATENT DOCUMENTS

| 3,942,880 | A |   | 3/1976  | Zelders, Jr. |
| 3,970,136 | A |   | 7/1976  | Cannell et al. |
| 4,225,569 | A |   | 9/1980  | Matsul et al. |
| 4,256,378 | A |   | 3/1981  | Prewo et al. |
| 4,376,803 | A |   | 3/1983  | Katzman |
| 4,450,207 | A |   | 5/1984  | Donomoto et al. |
| 4,451,119 | A |   | 5/1984  | Meyers et al. |
| 4,554,197 | A |   | 11/1985 | Chyung et al. |
| 4,623,228 | A |   | 11/1986 | Galasso et al. |
| 4,659,548 | A |   | 4/1987  | Gubbay et al. |
| 4,772,111 | A |   | 9/1988  | Shimura et al. |
| 4,828,008 | A |   | 5/1989  | White et al. |
| 4,842,398 | A |   | 6/1989  | Ducassou |
| 4,875,766 | A | * | 10/1989 | Shimodaira et al. ........ 359/883 |
| 4,915,494 | A |   | 4/1990  | Shipley et al. |
| 5,024,710 | A | * | 6/1991  | Sheaffer et al. .......... 156/89.25 |
| 5,178,709 | A |   | 1/1993  | Shimodaira et al. |

(Continued)

OTHER PUBLICATIONS

Peters, S.T., Handbook of Composites, 1998, Thompson Science, Second Edition, p. 190.*

(Continued)

Primary Examiner—Terrel Morris
Assistant Examiner—Matthew D. Matzek
(74) Attorney, Agent, or Firm—Thomas J. Finn; Leonard A. Alkov; Karl A. Vick

(57) ABSTRACT

A fiber reinforced matrix composite mirror that eliminates the problem of "print through". A layer of small unbundled fibers in the matrix diffuses and randomize any stresses that are created by the weave pattern of the fiber reinforcement so that the coarse texture is not transferred to the optical quality surface thus eliminating "print through". The layer can be provided in a variety of embodiments using random fibrils, a continuous fiber mat or a weave of single or finely towed continuous fibers. The fiber reinforced mirror is constructed by adding a mixture of matrix pre-cursor and fibers or fibrils to a common graphite fiber reinforced matrix construction.

23 Claims, 7 Drawing Sheets

U.S. PATENT DOCUMENTS

| | | | |
|---|---|---|---|
| 5,229,196 A | | 7/1993 | Seibold et al. |
| 5,382,309 A | | 1/1995 | Seibold et al. |
| 5,428,483 A | * | 6/1995 | Sato et al. .................. 359/838 |
| 5,554,430 A | * | 9/1996 | Pollatta et al. .............. 428/113 |
| 5,834,115 A | * | 11/1998 | Weeks et al. ................ 428/370 |
| 5,907,430 A | | 5/1999 | Taylor et al. |
| 6,431,715 B1 | | 8/2002 | Scrivens |
| 6,628,904 B1 | * | 9/2003 | Yamada ........................ 399/27 |
| 6,951,397 B1 | * | 10/2005 | Winzer ....................... 359/846 |

OTHER PUBLICATIONS

Lim et al., Effect of Carbon Nanotube Addition on the Tribological Behavior of C/C Composites, Mar. 2002, Wear, vol. 252, Issues 5-6, pp. 512-517.*

Jim Mayo, et al. "Ultra-Lightweight Optics for Space Applications" Proc Of SPIE vol. 4013, UV, Optical, and IR Space Telescopes and Instruments, (Apr., 2000) pp. 687-698.

* cited by examiner

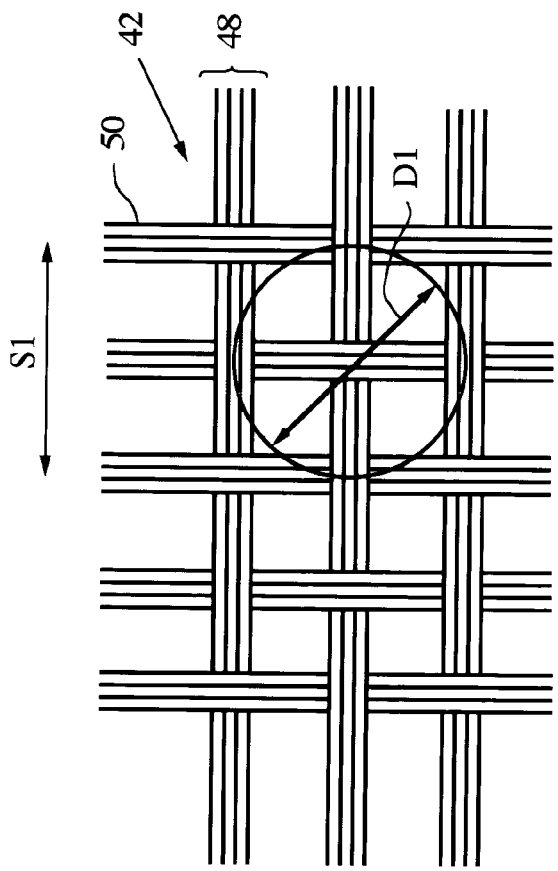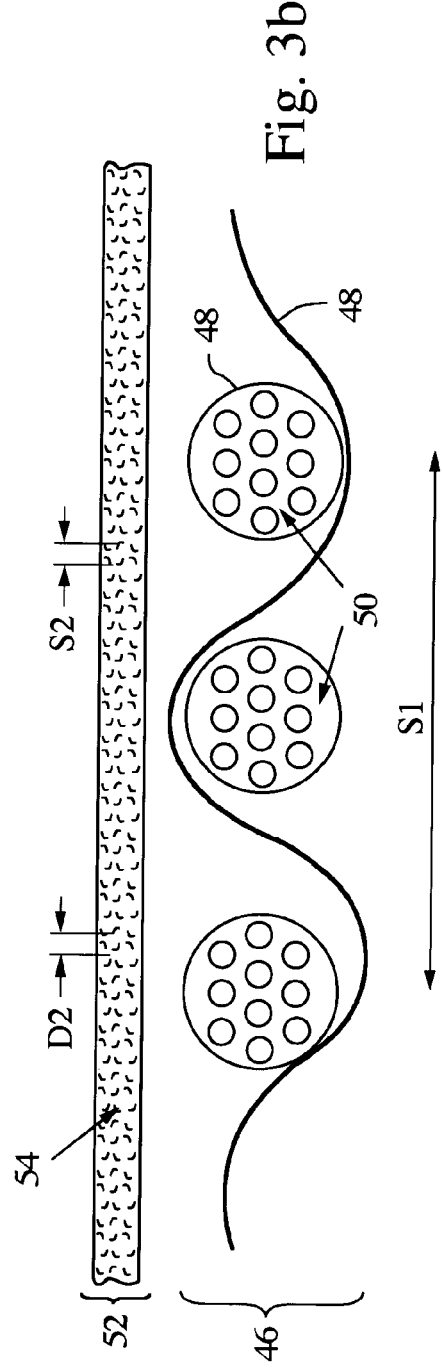

PRINT THROUGH ELIMINATION IN FIBER REINFORCED MATRIX COMPOSITE MIRRORS AND METHOD OF CONSTRUCTION

BACKGROUND OF THE INVENTION

1. Field of the Invention

This invention relates to fiber reinforced mirrors, and more specifically to the elimination of "print through" in fiber reinforced mirrors.

2. Description of the Related Art

Mirrors have been utilized in high precision optical systems for many decades. Critical to the successful application of these mirrors are material properties such as dimensional stability, low weight, high thermal conductivity, high stiffness, low coefficient of thermal expansion, etc. Different applications require various combinations of these properties. For example, many aerospace, telescope, airborne optics and fast-scanning optical applications require low weight, high stiffness and high dimensional stability. Beryllium is particularly attractive in this regard.

Beryllium mirrors are fabricated by consolidating beryllium powder by hot isostatic pressing (HIP) into a block, which is then machined into the desired shape of a mirror. Beryllium is a very expensive metal and has limited sources of availability. Furthermore, beryllium dust is toxic and has very limited near-net-shaping capability. A high precision beryllium mirror is therefore machined out of a beryllium block, thus wasting most of the beryllium by converting it into beryllium chips. The toxicity of the beryllium dust requires a special machine shop to meet rigid Occupational Safety and Health Administration (OSHA) requirements for safety, which adds to its expense. A material that is nontoxic and cheaper than beryllium metal is desired.

As part of a concerted effort to eliminate the use of beryllium materials, fiber reinforced matrix composite mirrors have been under development for over twenty years. As shown in FIG. 1a, a matrix material 10 such as carbon (U.S. Pat. Nos. 4,451,119 and 4,915,494), polymer (U.S. Pat. Nos. 4,842,398, 5,178,709, 5,907,430 and 6,431,715 ceramic (U.S. Pat. Nos. 4,256,378 and 5,382,309) or metal is reinforced with a graphite fiber weave (or Silicon Carbide, Boron, etc) 12 to form a lightweight, thermally conductive and stiff substrate 14. To provide the necessary stiffness, several hundred to many thousand fibers 16 are bundled into "tows" 18, which are woven into a desired pattern. A fiber has a diameter of at least one micron and more typically ten to twenty microns and a tow has a diameter of 0.5 to 7 mm. The weave pattern has a relatively coarse structure or texture as defined by the center-to-center spacing S1 of alternate tows, suitably 1.5 mm to 17 mm, or the average diameter D1 of the inscribed circle between the centers of in-phase tows to provide the requisite stiffness. In the case of a weave, S1 and D1 are equal.

A thin layer 20 of the un-reinforced matrix material is formed on the substrate 14 and processed to create an optical quality surface 21. A reflective optical coating 22 (gold, silver, aluminum. etc) is evaporated onto the optical surface to define a mirror surface that conforms in shape to the optical quality surface. The un-reinforced layer does not contribute appreciably to the strength or stiffness of the composite mirror. Hence, to minimize weight the layer is only thick enough, typically about 0.1 mm, to define the optical surface.

The fiber reinforced matrix provides low weight and high stiffness approaching that of beryllium without high cost or toxicity. However, unless the un-reinforced layer is made very thick and thus very heavy, the composite mirror will, over time and temperature cycling, produce high spatial frequency deformations 24 in the optical surface 21, hence reflective optical coating 22 as best shown in FIG. 1b. The coefficient of thermal expansion (CTE) and stress mismatches within the reinforced substrate, and between the substrate and un-reinforced layer, creates a stress/strain pattern that emulates the coarse texture of the weave pattern. The un-reinforced layer transfers the stress/strain pattern to the optical surface. This is known as "print through" and effectively degrades the optical properties of the mirror. As a result, fiber reinforced mirrors have not achieved successful commercialization to replace beryllium and other isotropic metal mirrors.

There remains an acute and present need to solve the print-through problem for fiber reinforced matrix composite mirrors without degrading weight, stiffness or dimensional stability.

SUMMARY OF THE INVENTION

The present invention provides a fiber reinforced matrix composite mirror and method of construction that eliminates the problem of "print through".

This is accomplished by forming a layer of small unbundled fibers within the matrix on the surface of the fiber reinforced substrate. Although this layer contributes to the overall mirror stiffness, its primary function is to diffuse out and randomize any stresses that are created by the weave pattern of the fiber reinforcement so that the coarse texture is not transferred to the optical quality surface, thus eliminating "print through".

The fine structure required to diffuse and randomize any stresses can be provided in a variety of embodiments using random fiber segments ("fibrils"), a continuous fiber mat or a weave of single or finely towed continuous fibers. The scale factor of the fiber structure is preferably at least an order of magnitude smaller than the underlying fiber weave. The individual fibers are preferably much finer than the coarse fibers, suitably submicron diameter, preferably 0.1 to 0.2 micron using currently available graphite fibers and possibly much less than 0.1 micron using carbon nanotube technology. The fibers in the additional layer and the substrate are suitably the same material to match their stress and CTE properties.

In an exemplary embodiment, the mirror includes a carbon-carbon substrate (a stack of graphite fiber weaves in a carbon matrix) and a layer of submicron graphite fibrils bound within the same carbon matrix. An optical quality surface is formed either in the fibril layer or in another thin layer formed of a metal, semi-metal or ceramic material. The graphite fibrils have substantially the same CTE and stiffness properties as the graphite fiber weave. The carbon matrix does not have the strength and stiffness of the fibers but does exhibit a similar CTE. The fibrils have a submicron diameter, preferably less than 0.3 microns with a length greater than 100 times their diameter and provide a very fine structure for diffusing any pattern of stress.

The fiber reinforced mirror is generally constructed by adding the thin layer of submicron fibers or fibrils and matrix precursor to a common graphite fiber construction and pre-heating this assembly to carbonize the matrix pre-cursor to bind the coarse and fine fibers within the matrix to form a "green form" part. The green form part is transferred to a high temperature oven to graphitize the matrix. The finished substrate is then processed to form an optical quality surface in either the submicron fiber layer or an additional thin metal, semi-metal or ceramic layer. A reflective optical coating is deposited (gold, silver, aluminum. etc) on the optical surface. The specific ordering of the steps of when the matrix pre-cursor is added to the process and whether the coarse and fine fiber layers are pre-heated and even graphitized together or in sequence will depend on the particular application.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 3a and 3b are top and side views showing the coarse and fine structure of the fiber reinforced matrix;

DETAILED DESCRIPTION OF THE INVENTION

The present invention provides a fiber reinforced matrix composite mirror and method of construction that eliminates the problem of "print through".

Figure 1A:
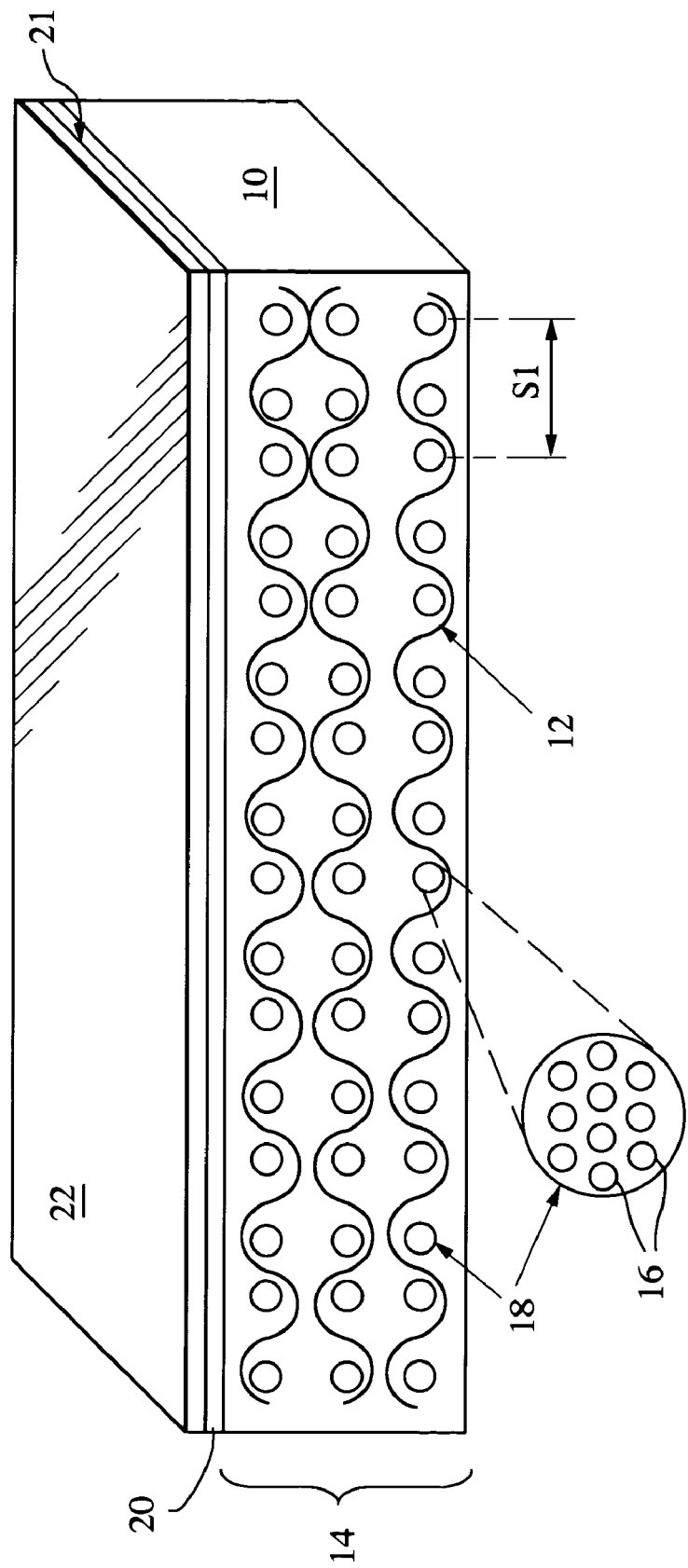
FIGS. 1a and 1b, as described above, depict a known fiber reinforced mirror and illustrate the print through problem.
Figure 1B:
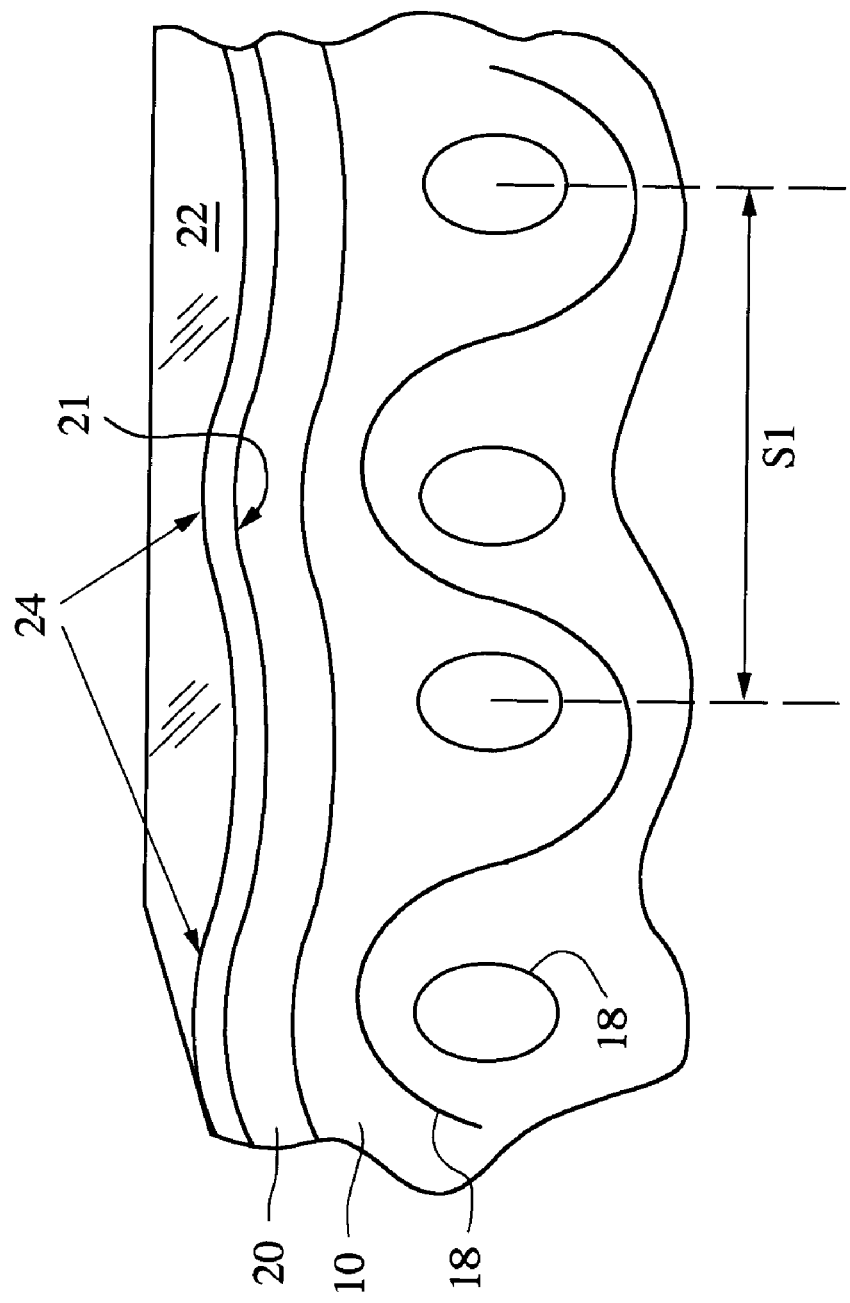
Figure 2:
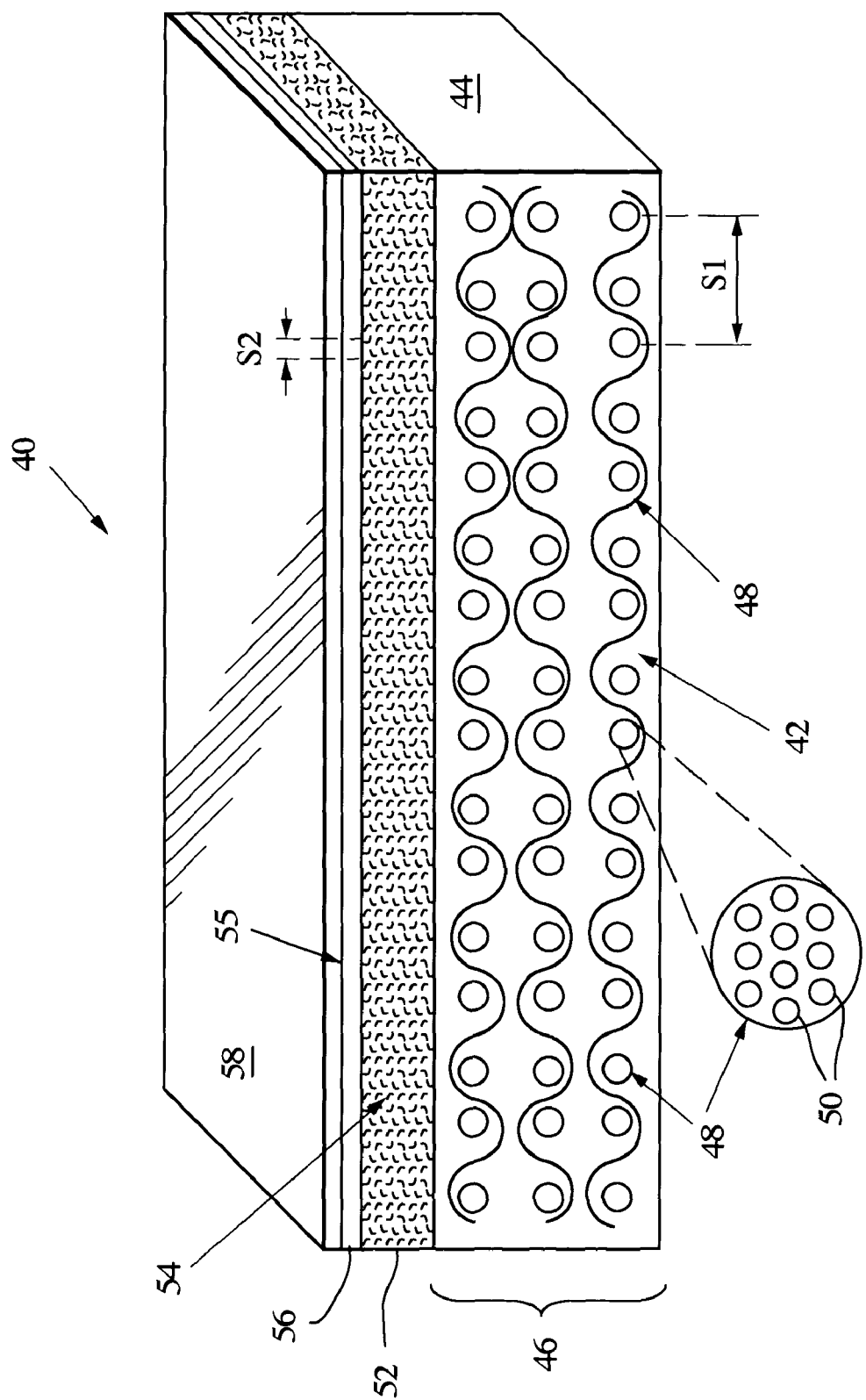
FIG. 2 is a cross-sectional illustration of a fiber reinforced matrix composite mirror including a fine fiber layer in accordance with the present invention.

As shown in FIG. 2, a composite mirror 40 includes a stack of graphite fiber weaves 42 that reinforce a matrix 44, suitably a carbon, ceramic (glass), metal or polymer material, to provide a lightweight yet stiff substrate 46. Each tow 48 includes a few hundred to many thousand fibers 50. A layer 52 of small un-towed fibers 54 is bound within the matrix 44 on the surface of the fiber reinforced substrate. An optical quality surface 55 is formed in layer 52 or, as shown here, in an additional layer 56, suitably a metal, semi-metal, carbon, polymer, or ceramic material. A reflective optical coating 58 is deposited on the optical quality surface to provide a mirror surface, which conforms to the shape of the optical quality surface.

Although layer 52 contributes to the overall mirror stiffness, its primary function is to diffuse and randomize any stresses that are created by the weave pattern of the fiber reinforcement so that the coarse texture is not transferred to the optical surface thus eliminating "print through". The fine structure required to diffuse and randomize any stresses can be provided in a variety of embodiments using random fiber segments ("fibrils"), a continuous fiber mat or a weave of single or finely towed continuous fibers. The "scale factor" as measured by the average center-to-center spacing S2, average diameter D2 of an inscriber circle or some other measure of structural scale is preferably at least an order of magnitude smaller than the scale factor S1 or D1 of the underlying fiber weave 42. The individual fibers or fibrils 54 are preferably much finer than the coarse fibers 50, suitably submicron and preferably 0.1 to 0.2 micron in diameter. The fibers in layer 52 and substrate 46 are suitably the same material to match their stress and CTE properties.

The coarse structural pattern of the fiber reinforced substrate 46 is such that when subjected to temperature cycling creates the stresses that ordinarily cause print through and the relatively fine and randomized properties of layer 52 are such as to diffuse the stress and eliminate print through as shown in FIGS. 3a and 3b. In a typical graphite fiber weave 42, each tow will include a few hundred to a few hundred thousand bundled fibers. Each of these fibers is at least 1 micron in diameter and typically 10–20 um. Depending upon the number and size of the fibers and the compression of the tow, the tow will have a diameter of approximately 0.5 to 7 mm. For the pattern shown in FIG. 3a, the scale factor that characterizes the structural pattern of the weave is twice the tow diameter plus the gap between the tows. In this example, the scale factor is between about 1.5 and 20 mm. The total thickness of the stack ranges from 1 mm for small aperture mirrors up to approximately 10 cm for large aperture mirrors. Although the specifics of any weave, its pattern, tightness of the weave, size of the tows, etc. may change, in order to provide the requisite stiffness using currently available fibers the weave will have a coarse structural pattern as characterized by a scale factor of at least about 1 millimeter The coefficient of thermal expansion (CTE) and stress mismatches within the reinforced substrate 46 and between the substrate and layer 52 creates a stress/strain pattern that emulates the coarse texture of the weave pattern. These stresses can be reduced but not eliminated by selecting materials, graphite fibers and a carbon or glass matrix, that minimize any mismatch. In known fiber reinforced mirrors, this stress pattern is transferred through the thin monolithic un-reinforced layer to the optical surface resulting in print through. In accordance with the invention, the reinforcement of layer 52 with small unbundled fibers or fibrils 54 relieves and diffuses the stress pattern within layer 52 thereby eliminating measurable or detectable print through. An optical quality surface typically has an initial surface quality of 10 nanometers RMS. Print through would deteriorate surface quality to worse than 40 nanometers RMS. The inclusion of layer 52 maintains surface quality to better than 15 nanometers RMS.

Figure 4A:
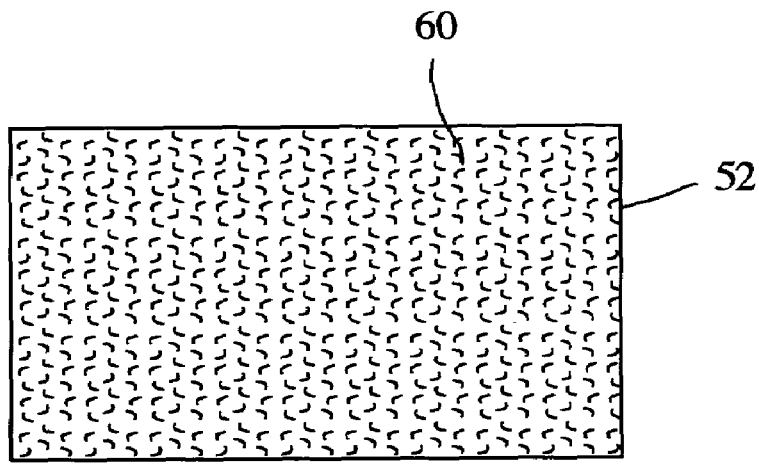
FIGS. 4a through 4c are top views of random fibrils, continuous single-fiber weave and continuous fiber mat embodiments of the fine reinforcement layer.
Figure 4B:
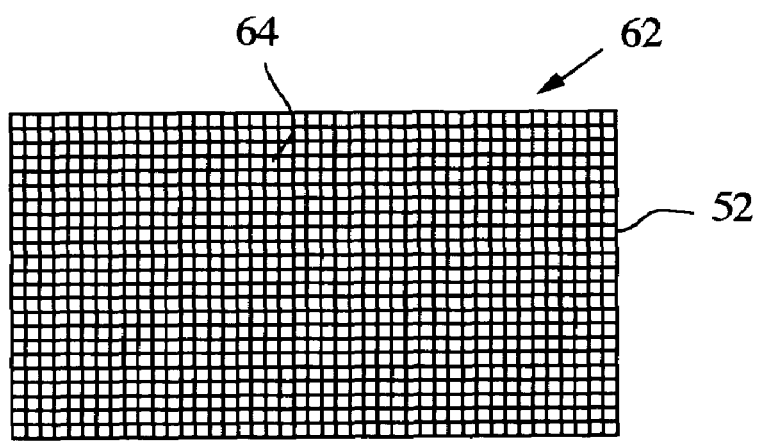
Figure 4C:
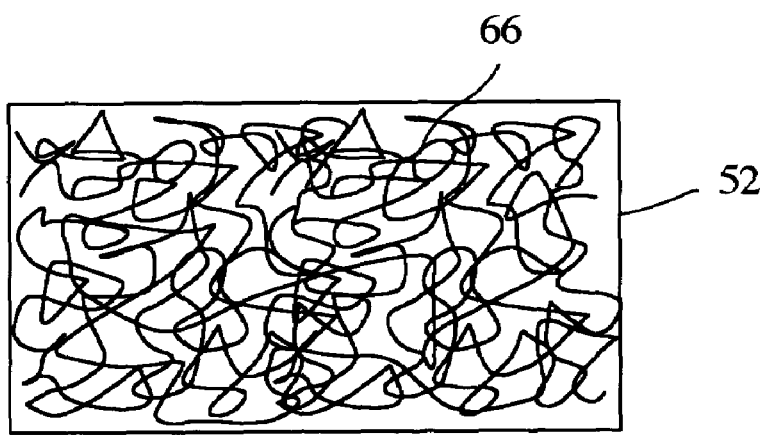

As shown in FIGS. 4a through 4c, the fine structure required to diffuse and randomize any stresses in layer 52 can be provided in a variety of embodiments using random fiber segments ("fibrils") 60, a weave 62 of single or finely towed (<200 fibers) continuous fibers 64 or a continuous fiber mat 66.

As shown in FIG. 4a, fibrils 60 are dispersed randomly in matrix in layer 52. Using currently available vapor grown fibers, the fibrils have a submicron diameter, preferably less than 0.3 microns with a length greater than 100 times their diameter. Fibrils formed of carbon-nanotubes could have diameters less than 0.01 microns with lengths greater than 100 times their diameter. Carbon-nanotubes are currently cost prohibitive but may become a viable alternative over time. The fibrils will exhibit a scale factor, e.g. average center-to-center spacing S2 or an average diameter of an inscribed circle D2 inside fibril clusters, from as small as 100 nm for carbon nanotubes up to 0.005 mm for submicron fibrils. Because the fibrils are very thin and randomized throughout the layer, they provide the best diffusion properties. As a result, layer 52 can be thinner, typically 0.1 to 2 mm than the untowed weave or mat configurations.

As shown in FIG. 4b, a weave 62 of single or finely towed continuous fibers 64 are bound in the matrix in layer 52. The incorporation of a second thinner and finer weave pattern diffuses the stresses from the underlying thicker and coarse weave pattern. To effectively eliminate print through, layer 52 may need to be somewhat thicker than when configured with the random fibrils. In a typical graphite fiber weave 62 the fibers are preferably untowed or finely towed with only a few bundled fibers. The same fibers as used in the underlying towed weave could be used and greatly reduce if not eliminate print through. However, smaller diameter fibers, suitably submicron, would be more effective. The scale factor S2 or D2 that characterizes the weave is between about 0.001 and 0.1 mm. This is more than one order of magnitude smaller than the scale factor of the coarse weave in the substrate and sufficient to eliminate print through.

As shown in FIG. 4c, a mat 66 of continuous fibers are bound in the matrix in layer 52. The randomized pattern of very fine fiber is effective to eliminate print through. The same fibers as used in the underlying towed weave could be used and greatly reduce if not eliminate print through. However, smaller diameter fibers would be more effective, preferably submicron. The scale factor S2 or D2 that characterizes the mat is the center-to-center spacing of adjacent fibers typically 0.05 mm. Again this is more than an order of magnitude smaller than the scale factor of the coarse weave in the substrate and sufficient to eliminate print through.

In an exemplary embodiment, the mirror 40 in FIG. 2 includes a carbon-carbon substrate 46 (a stack of graphite fiber weaves 42 in a carbon matrix 44) and a layer 52 of submicron graphite fibrils 54 bound within the same carbon matrix 44. A thin layer 56, about 0.1 mm thick, is deposited on layer 52 and diamond turned or polished to provide an optical quality surface. Layer 56 is formed from a metal, semi-metal (silicon or electroless nickel, etc), carbon or ceramic material. A reflective optical coating 58 is formed on the optical quality surface to provide the mirror surface.

The graphite fibrils 54 have substantially the same CTE and stiffness properties as the graphite fiber weave 42, which minimizes the created stress. The carbon matrix 44 does not have the strength and stiffness of the fibers 50 but does exhibit a similar CTE. The fibrils 54 have a submicron diameter, suitably less than 0.3 microns and preferably 0.1–0.2 microns with a length greater than 100 times their diameter and provide a very fine structure for diffusing any pattern of stress.

Carbon—Carbon (C—C) composites are a specialty class of materials having many unique properties making them attractive for a variety of demanding engineering applications. Similar to many other high-performance composites, C—C composites consist of a continuous fiber reinforcement (graphite fiber) held within a matrix phase (carbon). Unlike other composites, both the reinforcement and matrix phases consist of essentially pure carbon. Demonstrated desirable properties of C—C composites include very lightweight (1.4–1.9 g/cc), high stiffness, low coefficient of friction, good fatigue and shock resistance, moisture resistance, no outgassing, good biocompatibility, radiation resistant, low coefficient of thermal expansion (anisotropic in most cases), excellent strength retention versus temperature, and does not melt or soften at high temperatures. Raw materials of graphite fibers (depending on the fiber type) and pitch matrix precursors are generally inexpensive. The matrix infiltration and densification processes are both time consuming and energy intensive, and therefore, costly.

There are several reinforcement architectures used in state-of-the-art C—C composites. The most often used architecture is woven graphite fabric laid-up as laminates (2-D). There are also 3-dimensional and 4-dimensional woven structures that are considerably more expensive than cloth or fabric weaves. Other reinforcement architectures include multifilament threads referred to as tows, chopped discontinuous fiber mats and other discontinuous reinforcement forms. Regardless of the reinforcement architecture, the C—C composites are produced by resin or pitch impregnation followed by cure (thermosetting) and pyrolysis. To achieve low porosity composite, multiple cycles of impregnation and pyrolysis may be required.

The fiber reinforced mirror is generally constructed by simply adding the thin layer of submicron fibers or fibrils to the construction sequence for a known fiber reinforced matrix composite mirror. The additional complexity, time and expense to create the composite mirror are minimal. The result is the elimination of print through.

Figure 5:
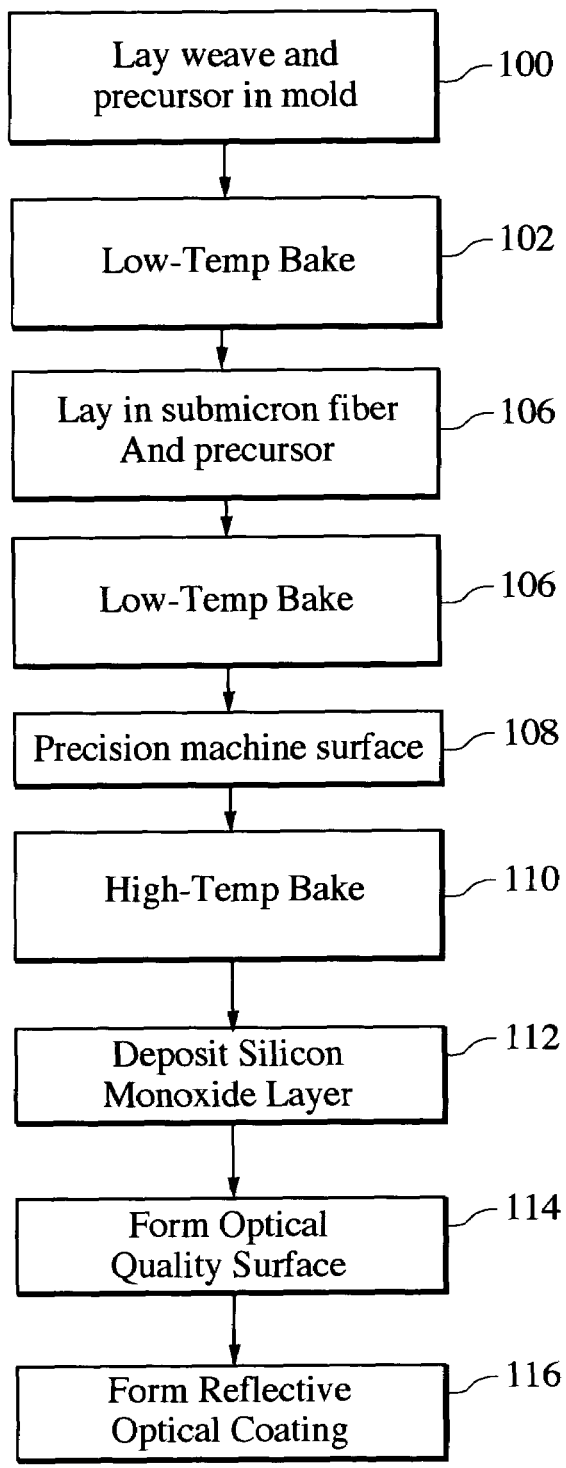
FIG. 5 is a flowchart of one method of constructing the composite mirror.

An exemplary construction sequence is shown in FIG. 5. Layers of cloth (woven tows of graphite fiber) and matrix precursor are laid in a mold created to the shape of the back of the desired mirror (step 100). Another mold created to nearly the shape of the front of the mirror is laid on the cloth. The assembly is placed in a low-temp oven and slowly heated to a temperature, e.g. 750° C. that converts the matrix precursor to a partially carbonized solid or "green-form" part (step 102). After cooling, the front surface mold is removed. A mixture of submicron fibrils and matrix precursor is spread over the front surface of the graphite cloth substrate (step 104). A second mold that is closer to the shape of the front of the desired mirror is laid on the submicron fibril layer. The assembly is placed back in the low-temp oven and slowly heated to a temperature, e.g. 800° C. that carbonizes the entire matrix precursor to the point that further heating will not soften the matrix (step 106). It may be possible to carbonize both the cloth and fibril layer in a step in which the cloth, fibril layer and matrix precursor are laid into the mold and then placed in the low-temp oven.

The carbon composite substrate is removed from the molds and mounted on, for example, a single-point diamond turning machine and its front surface is precision machined to 0.1 mm from the final desired surface (step 108). The assembly is placed in a high-temp oven and heated to a temperature, e.g. 3200° C., high enough to graphitize some or the entire matrix (step 110). The substrate is removed from the molds and placed in a chamber where 0.2 mm of silicon monoxide is deposited (step 112). The substrate is then diamond turned (or polished) to shape the silicon monoxide layer to the desired optical surface, thereby removing about 0.1 mm (step 114). The substrate is placed in another chamber where about 0.001 mm of a reflective metal is deposited on the optical surface to form the mirror surface (step 116). The mirror is then removed from the chamber.

The mirror may alternately be constructed by first constructing the fiber reinforced substrate from carbonization through graphitization and then forming the additional layer of submicron fibrils. This approach may facilitate better impregnation of the cloth, hence lower porosity of the substrate. The trade-off is duplication of a few steps.

Figure 6:
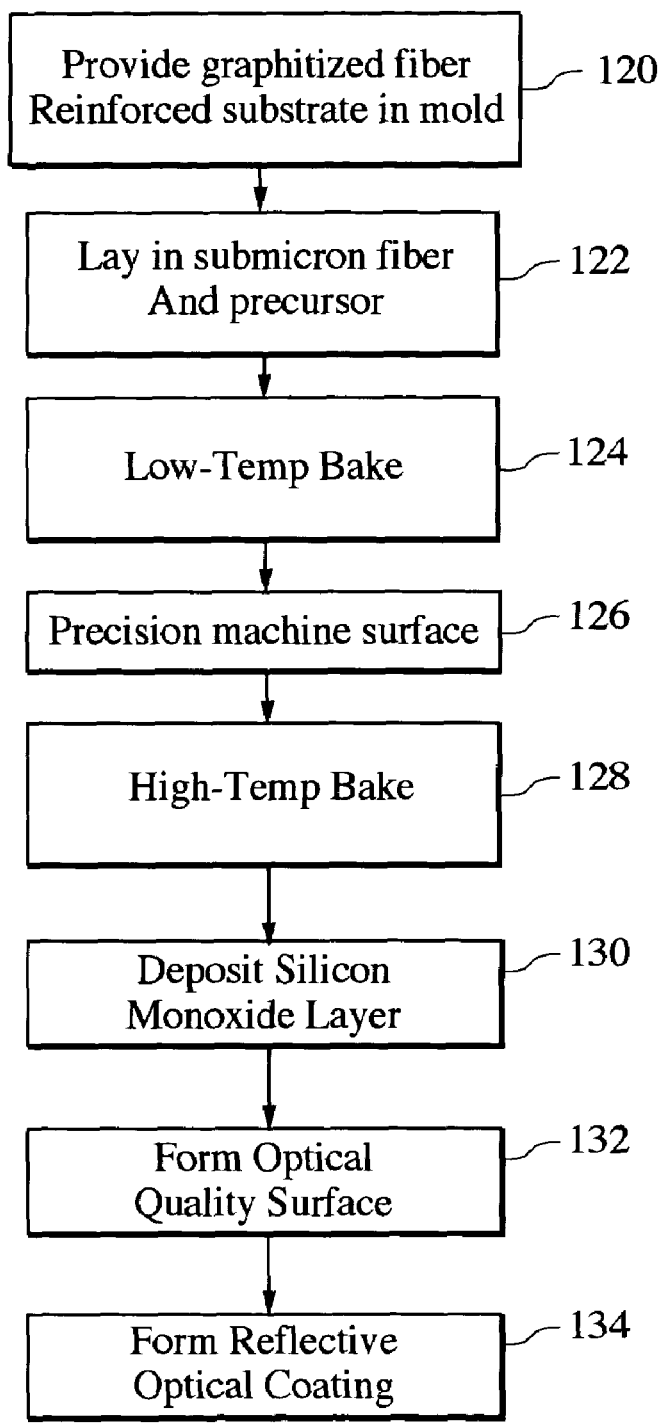
FIG. 6 is a flowchart of a second method of constructing the composite mirror.

As illustrated in FIG. 6, a graphitized fiber reinforced substrate is provided in a mold (step 120). Multiple cycles of impregnation and pyrolysis (add matrix precursor and heat) may be required to form the substrate with the desired porosity. Thereafter, a mixture of submicron fibrils and matrix precursor is spread over the front surface of the graphite cloth substrate (step 122). A second mold that is closer to the shape of the front of the desired mirror is laid on the submicron fibril layer. The assembly is placed back in the low-temp oven and slowly heated to a temperature, e.g. 800° C. that carbonizes the entire matrix precursor to the point that further heating will not soften the matrix (step 124). The carbon composite substrate is removed from the molds and its front surface is precision machined to 0.1 mm from the final desired surface (step 126). The assembly is placed in a high-temp oven and heated to a temperature, e.g. 3200° C., high enough to graphitize some or the entire matrix (step 128). The substrate is removed from the molds and placed in a chamber where 0.2 mm of silicon monoxide is deposited (step 130). The substrate is then diamond turned (or polished) to shape the silicon monoxide layer to the desired optical surface, thereby removing about 0.1 mm (step 132). The substrate is placed in another chamber where about 0.001 mm of a reflective metal is deposited on the optical surface to form the mirror surface (step 134). The mirror is then removed from the chamber.

While several illustrative embodiments of the invention have been shown and described, numerous variations and alternate embodiments will occur to those skilled in the art. For example, materials such as Aluminum Oxide, Silicon-Carbide, Boron Carbide or Boron Nitride may be used to form the fibers instead of graphite. Instead of being towed and woven into a cloth, the coarse fibers could form a mat or large densely packed fibrils for reinforcing the matrix. Such variations and alternate embodiments are contemplated, and can be made without departing from the spirit and scope of the invention as defined in the appended claims.

I claim:

1. A mirror comprising: a fiber reinforced substrate including first fibers arranged in a coarse structural pattern; an optical quality surface on the substrate; a reflective optical coating on the optical quality surface; and a fiber reinforced layer between the substrate and the optical quality surface, said fiber reinforced layer including submicron diameter second fibers arranged in a fine structure that diffuses print through the coarse structural pattern from the substrate to the optical quality surface.

2. The mirror of claim 1, wherein the first and second fibers have substantially the same coefficient of thermal expansion (CTE).

3. The mirror of claim 1, wherein the first fibers are bundled into tows and woven into a cloth having a first scale factor determined by the tow-to-tow spacing, said fine structure of the second fibers having a second scale factor at least one order of magnitude smaller than said first scale factor.

4. The mirror of claim 1, wherein the optical quality surface has an initial surface quality of no worse than 10 nanometers RMS, said fiber reinforcement layer diffusing the print through of the coarse structural pattern to maintain surface quality to better than 15 nanometers RMS.

5. The mirror of claim 1, wherein the fiber reinforced layer's submicron diameter second fibers comprise fibrils having a diameter less than 1 micron and a length at least one hundred time the diameter, randomly arranged within the layer.

6. The mirror of claim 5, wherein the fibrils have a diameter less than 0.3 microns.

7. The mirror of claim 5, wherein the fibrils comprise carbon nanotubes having a diameter less than 0.01 micron in diameter.

8. The mirror of claim 1, wherein the fiber reinforced layer comprises a weave of continuous second fibers.

9. The mirror of claim 1, wherein the fiber reinforced layer comprises a towed weave of continuous second fibers in which each tow includes less than 200 fibers.

10. The mirror of claim 1, wherein the fiber reinforced layer comprises a mat of continuous second fibers.

11. The mirror of claim 1, wherein the optical quality surface is formed in the fiber reinforcement layer.

12. The mirror of claim 1, wherein the optical quality surface is formed in another layer formed on the fiber reinforcement layer.

13. A mirror comprising:
a common matrix;
a first layer of fibers in the matrix, said fibers arranged in a coarse structural pattern characterized by a first scale factor;
a second layer of submicron diameter fibers in the matrix over said first layer, said submicron diameter fibers arranged in a fine structure characterized by a second scale factor at least an order of magnitude less than the first scale factor; and
a reflective optical coating over said second layer,
said fine structure of the submicron diameter fibers in the second layer diffusing print through of the coarse structural pattern from the first layer to the reflective optical coating.

14. The mirror of claim 13, wherein the fibers in the first layer are bundled into tows and woven into a cloth, said first scale factor being a measure of the spacing of the tows in the cloth.

15. The mirror of claim 13, wherein the fibers in the second layer are arranged in randomly arranged fibrils, a weave or a mat.

16. The mirror of claim 13, wherein the fibers in the first layer and the fibers in the second layer are the same material.

17. A mirror comprising:
a substrate including a matrix reinforced with a plurality of fibers bundled into tows and woven into a cloth, said tows having a diameter of at least 0.5 mm;
a layer of fibrils randomly bound in the matrix on the surface of the substrate, said fibrils having a diameter of less than 1 micron; and
a reflective optical coating,
said randomly bound fibrils diffusing print through of the fiber weave in the substrate to the reflective optical coating.

18. The mirror of claim 17 wherein the matrix is a carbon, ceramic, metal or polymer material and the fibers in the cloth and the fibrils comprise the same material selected from graphite, silicon-carbide, Boron-carbide, Boron-nitride, or boron.

19. The mirror of claim 18, wherein said fibrils have a diameter less than 0.3 microns.

20. A mirror comprising:
a carbon-carbon substrate;
a layer of submicron diameter graphite fibrils randomly bound in the substrate's carbon matrix; and
a reflective optical coating.

21. The mirror of claim 20, wherein the carbon-carbon substrate comprises a plurality of graphite fibers bundled into tows and woven into a cloth in a carbon matrix, said cloth having a center-to-center spacing of at least 1 mm.

22. The mirror of claim 21, wherein the graphite fibrils have a diameter less than 0.3 microns.

23. A mirror comprising:
a substrate including a matrix reinforced with a plurality of first fibers bundled into tows and woven into a cloth, said tows having a diameter of at least 0.5 mm;
an optical quality surface on the substrate;
a reflective optical coating on the optical quality surface; and
a layer of submicron diameter second fibers, formed of the same material as said first fibers, arranged in a fine structure and bound in the matrix on the surface of the substrate below the optical quality surface, said fine structure of submicron diameter fibers diffusing and randomizing stresses created by the weave pattern of the cloth to inhibit transference of the pattern to the optical quality surface.

* * * * *

UNITED STATES PATENT AND TRADEMARK OFFICE
CERTIFICATE OF CORRECTION

| | | |
|---|---|---|
| PATENT NO. | : 7,022,629 B2 | |
| APPLICATION NO. | : 10/639059 | |
| DATED | : April 4, 2006 | |
| INVENTOR(S) | : P. Chris Theriault | |

It is certified that error appears in the above-identified patent and that said Letters Patent is hereby corrected as shown below:

Col. 1 line 6
Insert the following paragraph as the first paragraph of the specification:

> This invention was made with Government support under Contract HQ0006-01-C-001 awarded by Ballistic Missile Defence Agency. The Government has certain rights in this invention.

Signed and Sealed this

Twenty-fifth Day of July, 2006

JON W. DUDAS
*Director of the United States Patent and Trademark Office*